(12) United States Patent
Sasaki et al.

(10) Patent No.: US 10,975,599 B2
(45) Date of Patent: Apr. 13, 2021

(54) VEHICLE BODY STRUCTURE

(71) Applicant: HONDA MOTOR CO., LTD., Tokyo (JP)

(72) Inventors: Kazutada Sasaki, Wako (JP); Masato Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/510,303

(22) Filed: Jul. 12, 2019

(65) Prior Publication Data
US 2020/0024870 A1    Jan. 23, 2020

(30) Foreign Application Priority Data
Jul. 17, 2018 (JP) .............................. JP2018-133993

(51) Int. Cl.
| | | |
|---|---|---|
| B60J 7/00 | (2006.01) |
| E05B 77/08 | (2014.01) |
| B62D 25/10 | (2006.01) |
| E05B 83/24 | (2014.01) |
| E05B 79/20 | (2014.01) |
| B62D 25/12 | (2006.01) |

(52) U.S. Cl.
CPC ............ *E05B 77/08* (2013.01); *B62D 25/105* (2013.01); *B62D 25/12* (2013.01); *E05B 79/20* (2013.01); *E05B 83/24* (2013.01); *E05Y 2900/536* (2013.01)

(58) Field of Classification Search
CPC ....... B62D 25/105; B62D 25/12; E05B 83/24; E05B 79/20; E05Y 2900/536; B60R 21/38

USPC .................................................... 296/193.11
See application file for complete search history.

(56) References Cited

U.S. PATENT DOCUMENTS

| | | | | |
|---|---|---|---|---|
| 6,217,108 B1* | 4/2001 | Sasaki | .................. | B60R 21/013 |
| | | | | 180/274 |
| 6,364,402 B1* | 4/2002 | Sasaki | .................... | B60R 21/38 |
| | | | | 180/69.21 |
| 10,100,565 B2* | 10/2018 | Waskie | .................... | E05D 15/48 |
| 10,752,201 B2* | 8/2020 | Fredriksson | ........... | B62D 25/12 |
| 2002/0043417 A1* | 4/2002 | Ishizaki | .................. | B60R 21/38 |
| | | | | 180/274 |
| 2004/0113459 A1* | 6/2004 | Mattsson | ................ | B60R 21/38 |
| | | | | 296/187.04 |
| 2009/0302644 A1* | 12/2009 | Mori | ....................... | B60R 21/38 |
| | | | | 296/193.11 |
| 2010/0244484 A1* | 9/2010 | Nakaura | ................. | B60R 21/38 |
| | | | | 296/187.04 |

(Continued)

FOREIGN PATENT DOCUMENTS

| | | | | |
|---|---|---|---|---|
| CA | 2697097 A1 * | 10/2010 | ............ | B60R 21/38 |
| DE | 102015100627 A1 * | 8/2015 | ............ | B60R 21/38 |

(Continued)

*Primary Examiner* — Jerry E Redman
(74) *Attorney, Agent, or Firm* — Rankin, Hill & Clark LLP

(57) ABSTRACT

A vehicle body structure is provided. The vehicle body structure includes a hood provided at a vehicle body; and a transfer mechanism configured to move the hood relative to the vehicle body, the transfer mechanism including: a main actuator configured to move a vehicle-widthwise center portion of the hood relative to the vehicle body; and driven actuators configured to move the hood relative to the vehicle body on left and right sides of the main actuator.

4 Claims, 4 Drawing Sheets

(56) References Cited

U.S. PATENT DOCUMENTS

| | | | | |
|---|---|---|---|---|
| 2015/0151712 A1* | 6/2015 | Mardi | .................... | B60R 21/38 |
| | | | | 296/187.04 |
| 2015/0266514 A1* | 9/2015 | Iwano | ................... | B62D 25/10 |
| | | | | 296/193.11 |
| 2016/0016533 A1* | 1/2016 | Lindmark | ............ | B62D 25/12 |
| | | | | 296/193.11 |
| 2016/0114759 A1* | 4/2016 | Takaya | ................... | B60R 21/38 |
| | | | | 102/530 |
| 2018/0141516 A1* | 5/2018 | Hwang | ................. | B60R 21/38 |
| 2019/0061679 A1* | 2/2019 | Gabler | ................... | E05D 3/145 |
| 2019/0152426 A1* | 5/2019 | Szente | ................... | B60R 21/34 |
| 2019/0232915 A1* | 8/2019 | Szente | ................... | E05B 77/08 |
| 2020/0023806 A1* | 1/2020 | Sasaki | .................... | B60R 21/38 |
| 2020/0039467 A1* | 2/2020 | Ito | .......................... | B60R 21/01 |
| 2020/0047708 A1* | 2/2020 | Umezawa | ............... | B60R 21/38 |
| 2020/0047709 A1* | 2/2020 | Gunji | .................... | B60R 21/38 |
| 2020/0062202 A1* | 2/2020 | Umezawa | .............. | B60R 21/36 |
| 2020/0240181 A1* | 7/2020 | Ferri | ...................... | E05C 17/02 |
| 2020/0262386 A1* | 8/2020 | Sasaki | ................... | E05B 77/08 |

FOREIGN PATENT DOCUMENTS

| | | | | |
|---|---|---|---|---|
| JP | 5907193 B2 | 4/2016 | | |
| WO | WO-2011092422 A1 * | 8/2011 | ............ | B60R 21/38 |

\* cited by examiner

VEHICLE BODY STRUCTURE

TECHNICAL FIELD

The present invention relates to a vehicle body structure in which a hood provided at a vehicle body is moved relative to the vehicle body.

BACKGROUND ART

Conventionally, such a vehicle body structure as disclosed in JP5907193B has been known.

JP5907193B discloses a pop-up hood device used to lift a front end portion of a hood provided at a front section of a vehicle body. The pop-up hood device includes a hood locking device for locking the hood and a pair of left and right actuators. When a collision detection sensor detects a collision with a protection target, a control unit of the pop-up hood device actuates the pair of left and right actuators. Upon the actuation of the actuators, the hood locking device unlocks the hood. This enables the hood to be lifted, thereby reducing an impact when the protection target collides with the vehicle body.

SUMMARY OF INVENTION

Technical Problem

The vehicle body structure of JP5907193B, however, is configured to use the pair of left and right actuators to lift the hood. As a result, it is necessary to precisely keep a balance in how much the hood is lifted by the left and right actuators. If how much the hood is lifted by the left and right actuated is in imbalance, the lifted hood may be tilted in the left-right direction.

The present invention has been made in view of the above point. The present invention may provide a vehicle body structure such that a hood can be moved, without complicated adjustment and control, relative to a vehicle body while kept in good balance in the left-right direction.

Solution to Problem

The present invention provides an aspect of a vehicle body structure comprising: a hood provided at a vehicle body; and a transfer mechanism configured to move the hood relative to the vehicle body, the transfer mechanism comprising: a main actuator configured to move a vehicle-widthwise center portion of the hood relative to the vehicle body; and driven actuators configured to move the hood relative to the vehicle body on left and right sides of the main actuator.

Advantageous Effects of Invention

The present invention may allow for a vehicle body structure where a hood can be moved, without complicated adjustment and control, relative to a vehicle body while kept in good balance in the left-right direction.

DESCRIPTION OF EMBODIMENTS

Figure 1:
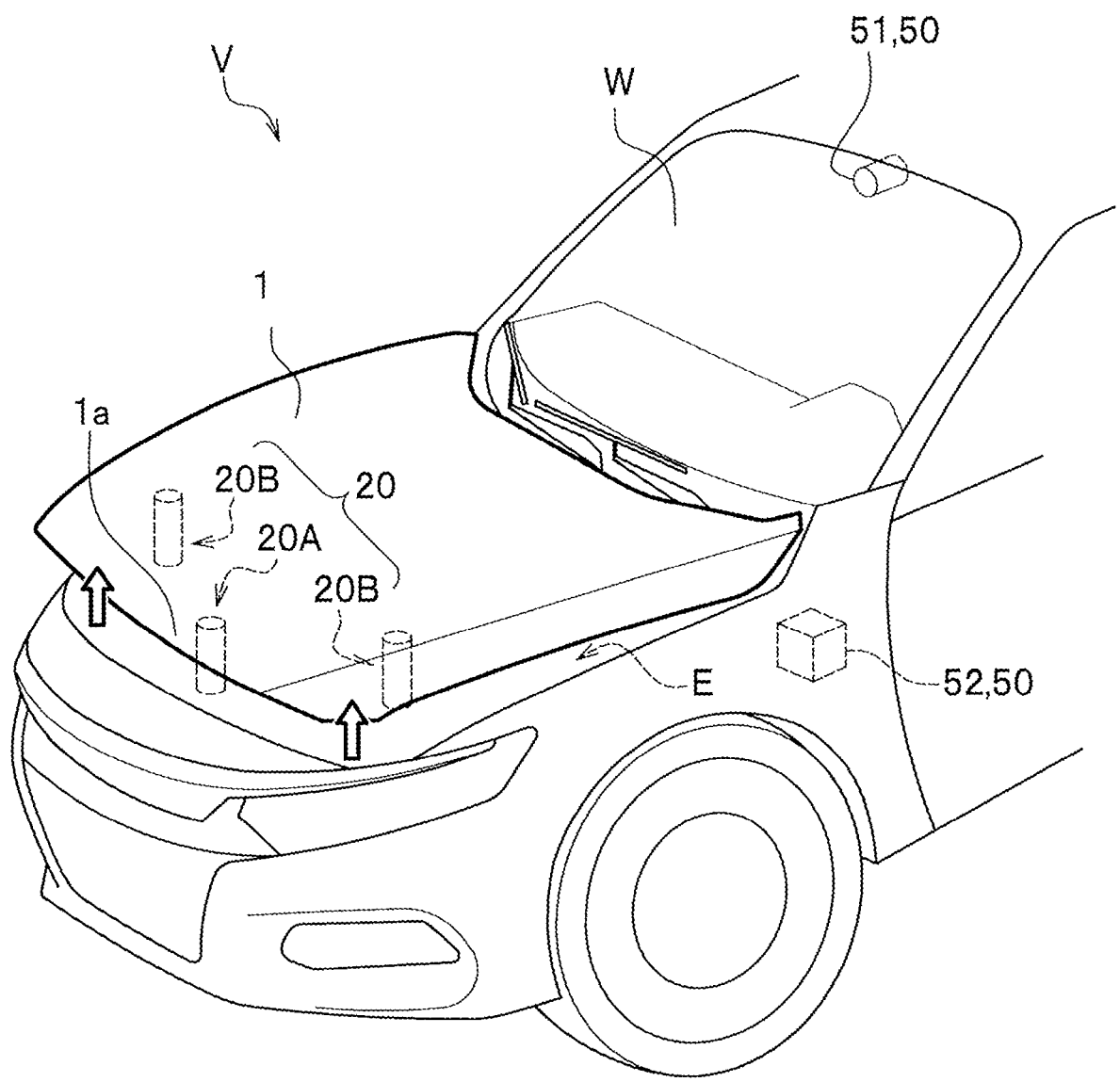
FIG. 1 is a partial perspective view of a front section of a vehicle body and indicates a state in which a hood is operated in a vehicle body structure according to an embodiment of the present invention.
Figure 1:
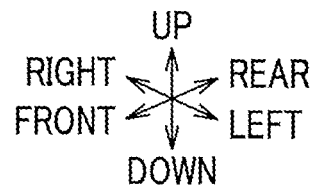

Next, an embodiment of the present invention is described in detail by appropriately referring to the Drawings. Hereinafter, the same elements have the same reference numerals so as to avoid redundancy. Directions are described based on the front-rear, left-right, up-down directions when viewed from a driver.

As shown in FIG. 1, a vehicle V having a vehicle body structure according to this embodiment includes a hood 1 that is positioned at a front section of the vehicle body and covers an upper surface of an engine room E. In addition, the vehicle V is provided with a transfer mechanism 20 by which the hood 1 can be moved relative to the vehicle body. The transfer mechanism 20 is configured to support the hood 1 movable with respect to the vehicle body and move upward a front portion of the hood 1 with respect to the vehicle body.

Figure 2:
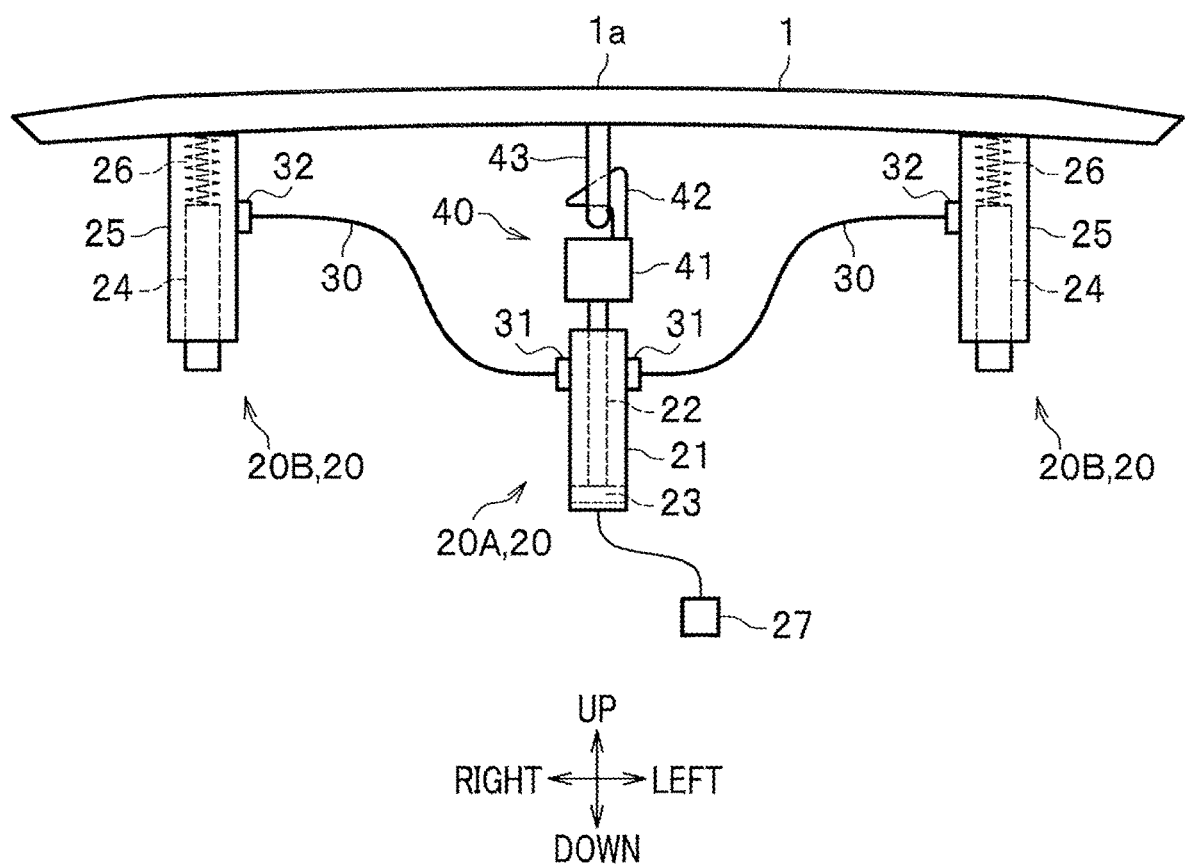
FIG. 2 is a schematic diagram of the hood, a main actuator, and driven actuators when viewed from the front side of the vehicle body.

As shown in FIGS. 1 and 2, the transfer mechanism 20 includes a main actuator 20A, which lifts a front end center portion of the hood 1, and a pair of driven actuators 20B, which lift both front end left and right side portions of the hood 1. The main actuator 20A and the driven actuators 20B are supported at given sites in the engine room E.

Specifically, as shown in FIG. 2, the main actuator 20A is arranged on the lower side at the front end center portion of the hood 1. A locking device 40 for keeping the hood 1 closed is arranged between the hood 1 and the main actuator 20A.

The main actuator 20A includes a tubular cylinder 21 and a rod 22 that can be displaced in the axial direction of the cylinder 21. The cylinder 21 houses a piston part 23 that is slidable in a vertical direction. A lower end of the rod 22 is connected to this piston part 23. An upper portion of the rod 22 extends upwardly of the cylinder 21. An upper end of the rod is attached to the bottom of a base part 41 of the locking device 40. The base part 41 is provided with a latch 42 that functions as a locking part. The latch 42 is locked to a striker 43 as a to-be-locked part provided on a lower surface of the front end center portion of the hood 1. Locking the latch 42 to the striker 43 enables the hood 1 to be kept closed such that the hood 1 covers the engine room E of the vehicle body.

Each driven actuator 20B is a member for supporting the lower side of either the left or right side portion of the hood 1. The driven actuators 20B are driven when the main actuator 20A is actuated and support the hood 1 from both the left and right sides.

The left and right driven actuators 20B have the same configuration, so that the left-side driven actuator 20B is herein described as an example. The driven actuator 20B includes: a support rod 24; a bottomed cylinder body 25 that can be moved vertically along the support rod 24; and a spring 26 that is biased and provided between an upper end of the support rod 24 and the bottom of the cylinder body 25.

Figure 4:
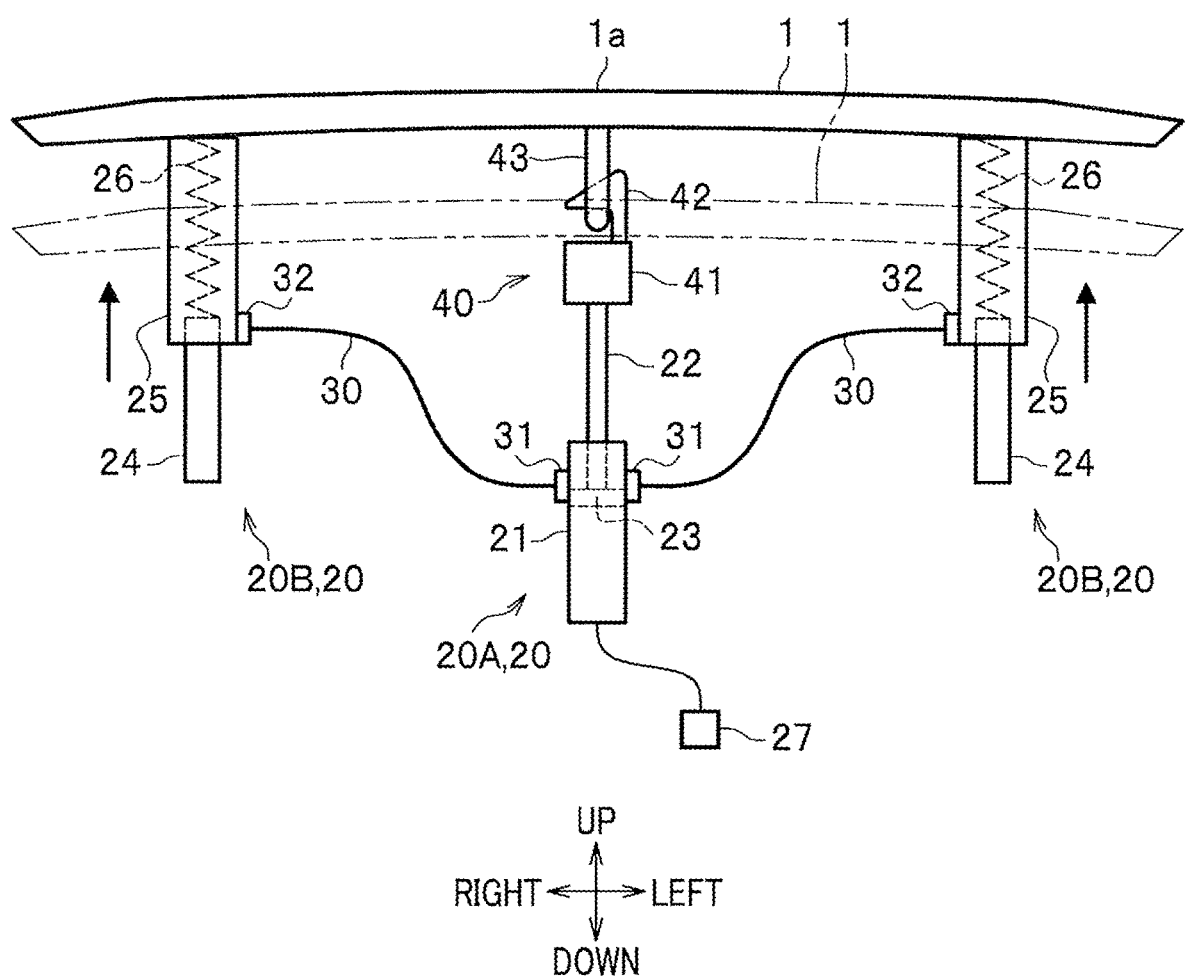
FIG. 4 is a schematic diagram illustrating a state in which the main actuator is actuated, and the driven actuators are then actuated when viewed from the front side of the vehicle body.

The driven actuator 20B is configured such that the action mechanism 32 is used to lock the cylinder body 25 to the support rod 24 while the spring 26 is being biased. The action mechanism 32 is actuated by the below-described mechanical coupling means using a wire 30 connected to the main actuator 20A so as to unlock the cylinder body 25 from the support rod 24. As described below, the action mechanism 32 of the driven actuator 20B is unlocked to stretch the biased spring 26 and urge the cylinder body 25 upward by using its biasing force (see FIG. 4). Note that the cylinder body 25, which has been moved upward, should be held at a predetermined height.

The coupling means includes: the wire 30; a traction mechanism 31 provided on the main actuator 20A side; and each action mechanism 32 provided on each driven actuator 20B side. The wire 30 is provided with a cylindrical outer case and an inner wire housed in the case. It is preferable that as the inner wire is used each rust-free, flexible, hard-to-stretch wire. Examples include those made of stainless steel material or high tensile strength glass fiber material.

The traction mechanism 31 is connected to one end of the wire 30. The traction mechanism 31 is actuated upon the actuation of the main actuator 20A and pulls the wire 30.

The action mechanism 32 is connected to the other end of the wire 30. The action mechanism 32 is coupled to this traction wire 30 and actuated after the wire 30 is pulled by the traction mechanism 31. This can unlock the cylinder body 25 from the support rod 24 in the driven actuator 20B.

The cylinder 21 of the main actuator 20A is connected to an inflator 27, which injects gas into the inside of the cylinder 21. The inflator 27 is a pyro-type one using a gas generator. The inflator 27 is triggered by a command from a control unit 52 of the below-described collision detection device 50 so as to inject gas.

Gas from the inflator 27 should be injected into the cylinder 21. In this case, the gas pressure causes the piston part 23 to slide upward, thereby moving the rod 22 upward (see FIGS. 3 and 4). Upon this rod 22 movement, the whole locking device 40 is lifted upward. Specifically, while the latch 42 of the base part 41 is kept locked to the striker 43 on the hood 1 side, the locking device 40 and the front portion of the hood 1 are integrally lifted.

Next, the collision detection device 50 is explained. As shown in FIG. 1, the collision detection device 50 includes: a camera 51 as a detector directed forward over a front window W; and a control unit 52 as a control means arranged at a suitable site in the engine room E, etc.

The camera 51 may be, for instance, an infrared camera or a commonly known camera used to capture an image. The camera 51 captures a vehicle front image over the hood 1 and thus detects a vehicle front situation. In addition, the camera 51 may be a camera used for an advanced driver-assistance system for assisting a driver's driving operation. The advanced driver-assistance system is a system that has been developed to automate, apply, and reinforce a vehicle system for safe and better driving.

The control unit 52 is configured to receive image data captured by the camera 51 and predict whether or not there is a protection target (hereinafter, simply referred to as a "pedestrian") such as a pedestrian (including a bicycle rider, etc.) who may approach, for instance, a traveling vehicle V and collide with a front end portion 1a of the hood 1. In this case, the control unit 52 calculates, for instance, every prescribed time, a change in how large the image (area) of the pedestrian who is positioned either close to or far from the front portion of the hood 1, and thus predicts whether or not there is a pedestrian who may collide with the front end portion 1a of the hood 1.

The control unit 52 sends, when the presence of a pedestrian who may collide with the front end portion 1a of the hood 1 is predicted, a triggering signal to the inflator 27 (see FIG. 2).

Note that a pressure sensor for detecting a collision with the front end (e.g., a bumper) of the vehicle body may be arranged and the control unit 52 may be configured to detect an actual collision based on a signal from this pressure sensor.

The following describes effects when the pedestrian collides with the front end portion of the vehicle body.

First, the ignition of the vehicle V, for example, is turned on and the driving is made possible. Next, the camera 51 of the collision detection device 50 starts capturing a vehicle front image. Then, the control unit 52 receives image data captured by the camera 51. The control unit 52, based on the received image data, starts predicting whether or not there is a pedestrian who may collide with the front end portion 1a of the hood 1.

Figure 3:
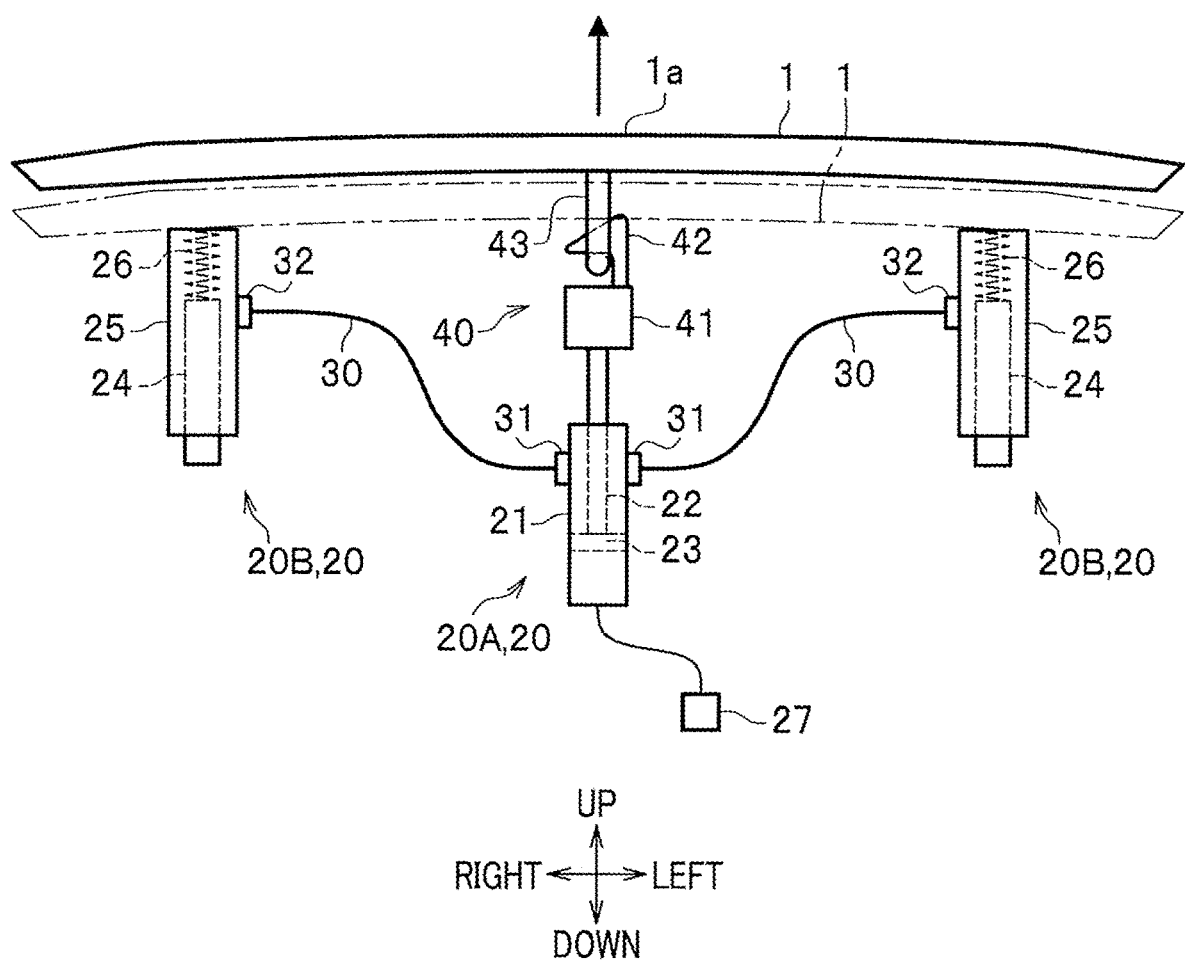
FIG. 3 is a schematic diagram illustrating a state in which the main actuator is under operation when viewed from the front side of the vehicle body.

The control unit 52 sends, when the presence of a pedestrian who may collide with the front end portion 1a of the hood 1 is predicted, a triggering signal to the inflator 27. Subsequently, the inflator 27 is triggered. As shown in FIG. 3, this causes the inflator 27 to inject gas into the cylinder 21 of the main actuator 20A, thereby causing the piston part 23 to slide upward and thus moving the rod 22 upward so as to lift the whole locking device 40 upward. Accordingly, the main actuator 20A lifts the front end center portion of the hood 1 at a predetermined height (see FIG. 4).

Once the main actuator 20A is actuated in this manner, the coupling means is used to actuate the pair of driven actuators 20B. In this case, the injected gas causes the piston part 23 of the main actuator 20A to slide upward. Then, the traction mechanism 31 is actuated to pull the wire 30. When the wire 30 is pulled, the action mechanism 32 on each driven actuator 20B side is actuated while coupled to the traction wire 30. This unlocks the cylinder body 25 from the support rod 24 in the driven actuator 20B to stretch the biased spring 26 and urge the cylinder body 25 upward by using its biasing force (see FIG. 4). That is, after the main actuator 20A is actuated, the pair of driven actuators 20B are actuated stepwise. Then, the driven actuators 20B support the both left and right sides of the hood 1 from the bottom side. The timing when the driven actuators 20B are actuated may be a timing immediately after the main actuator 20A has been actuated, a timing when the piston part 23 has been moved upward by a certain distance, or a timing when upward movement of the piston part 23 has been completed.

The above has described the vehicle body structure according to this embodiment. The main actuator 20A lifts the front end center portion of the hood 1. Then, the mechanical coupling means is used to stepwise actuate the driven actuators 20B, thereby supporting the both left and right end portions of the hood 1 from the bottom side. Hence, it is possible that the front portion of the hood 1 can be moved (lifted), without conventional complicated adjustment and control, relative to the vehicle body while kept in good balance in the left-right direction.

In addition, the main actuator 20A moves, together with the locking device 40, the vehicle-widthwise center portion of the hood 1 relative to the vehicle body. Accordingly, while the latch 42 is kept locked to the striker 43, the front end portion 1a of the hood 1 can be lifted. Thus, it is unnecessary to provide an additional device for unlocking the latch 42 from the striker 43. This makes simple the structure of lifting the front end portion 1a of the hood 1.

In addition, each driven actuator 20B uses the coupling mechanism, which involves the wire 30, the traction mechanism 31, and the action mechanism 32, to lift the hood 1. Consequently, it is unnecessary to provide an additional actuator using, for instance, the inflator 27, so that the equivalent function can be achieved at low cost.

Further, the main actuator and the driven actuators are used to move the hood 1 upward. This makes it possible to stably lift the hood 1.

Hereinabove, the vehicle body structure according to this embodiment has been illustrated by referring to the Drawings. However, the present invention is not limited to this embodiment and can be suitably modified without departing from the spirit of the present invention.

For instance, the pair of left and right driven actuators 20B has been provided. The present invention is not limited to this configuration. It is possible to provide either a left or right driven actuator.

In addition, the main actuator 20A may be configured to directly lift the front end portion 1a of the hood 1. In this case, an unlocking means for unlocking the locking device 40 should be provided so as to unlock the hood 1 in the vehicle body. Note that the unlocking means may be cooperated with the main actuator 20A so as to unlock the locking device 40.

In addition, the main actuator 20A and the driven actuators 20B are configured to lift the front end portion 1a of the hood 1. The present invention is not limited to this configuration. They may be configured to lift a rear end portion of the hood 1.

In addition, in the above embodiments, a hood of the vehicle body structure is referred to as and applied to the hood 1. The present invention is not limited to this configuration. The hood may be applied to a trunk hood at a rear section of the vehicle body and other hoods.

In addition, a mechanical means including the wire 30 has been adopted as the coupling means. The present invention is not limited to this configuration. It is possible to employ an electrical means using an electric signal, etc.

In addition, the camera 51 has been used as the detector. The present invention is not limited to this configuration. A radar device and/or a pressure sensor may be used to detect a pedestrian.

In addition, the present invention may be widely applicable to hybrid vehicles and energy-storage-carrying vehicles such as electric vehicles and fuel cell vehicles.

REFERENCE SIGNS LIST

1 Hood
20 Transfer mechanism
20A Main actuator
20B Driven actuator
30 Wire
31 Traction mechanism
32 Action mechanism
40 Locking device
V Vehicle

The invention claimed is:

1. A vehicle body structure comprising:
a hood rotatably supported by a vehicle body;
a transfer mechanism configured to move the hood relative to the vehicle body, the transfer mechanism comprising:
a main actuator configured to move a vehicle-widthwise center portion of the hood relative to the vehicle body; and
driven actuators configured to move the hood relative to the vehicle body on left and right sides of the main actuator;
a wire connecting the main actuator and each driven actuator;
a traction mechanism provided at the main actuator and configured to pull the wire when actuated; and
an action mechanism provided at each driven actuator and configured to be actuated using the wire pulled by the traction mechanism,
wherein each driven actuator moves the hood relative to the vehicle body by the actuation of the action mechanism.

2. The vehicle body structure according to claim 1, further comprising a locking device configured to lock the hood to the vehicle body,
wherein the main actuator moves, together with the locking device, the vehicle-widthwise center portion of the hood relative to the vehicle body.

3. The vehicle body structure according to claim 1, wherein the main actuator and the driven actuators move upward the hood relative to the vehicle body.

4. A vehicle body structure comprising:
a hood rotatably supported by a vehicle body; and
a transfer mechanism configured to move the hood relative to the vehicle body, the transfer mechanism comprising:
a main actuator including a cylinder housing a piston part slidable in the cylinder, and a rod having a lower end connected to the piston part, the rod being configured for being displaced in an axial direction of the cylinder such that the main actuator moves a vehicle-widthwise center portion of the hood relative to the vehicle body;
driven actuators configured to move the hood relative to the vehicle body on left and right sides of the main actuator;
a locking device configured to lock the hood to the vehicle body; and
a base part included in the locking device, wherein an upper end of the rod is attached to the base part.

* * * * *